United States Patent
Herlocker et al.

(10) Patent No.: US 12,031,733 B2
(45) Date of Patent: Jul. 9, 2024

(54) METHOD FOR PHYSICAL SYSTEM ANOMALY DETECTION

(71) Applicant: Tignis, Inc., Seattle, WA (US)

(72) Inventors: Jonathan L. Herlocker, Seattle, WA (US); Matt McLaughlin, Seattle, WA (US); Alexander Fry, Seattle, WA (US)

(73) Assignee: Tignis, Inc., Seattle, WA (US)

( * ) Notice: Subject to any disclaimer, the term of this patent is extended or adjusted under 35 U.S.C. 154(b) by 684 days.

(21) Appl. No.: 16/716,993

(22) Filed: Dec. 17, 2019

(65) Prior Publication Data

US 2021/0182693 A1 Jun. 17, 2021

(51) Int. Cl.
| | |
|---|---|
| *G06N 3/088* | (2023.01) |
| *F24F 11/38* | (2018.01) |
| *G06F 17/18* | (2006.01) |
| *G06N 3/08* | (2023.01) |
| *G16Y 40/10* | (2020.01) |
| *G16Y 40/20* | (2020.01) |

(52) U.S. Cl.
CPC .............. *F24F 11/38* (2018.01); *G06F 17/18* (2013.01); *G06N 3/08* (2013.01); *G06N 3/088* (2013.01); *G16Y 40/10* (2020.01); *G16Y 40/20* (2020.01)

(58) Field of Classification Search
CPC ........ G06N 3/088; G06N 3/08; G06N 3/0895; G06N 3/09; G06N 3/091; G06N 3/092; G06N 3/094; G06N 3/096; G06N 3/098; G06N 3/0985; G16Y 40/10; G16Y 40/20; G06F 17/18

See application file for complete search history.

(56) References Cited

U.S. PATENT DOCUMENTS

| | | |
|---|---|---|
| 8,145,444 B1 | 3/2012 | Bickford |
| 2002/0198990 A1 | 12/2002 | Bradfield |
| 2005/0027379 A1 | 2/2005 | Dyk |
| 2013/0030765 A1 | 1/2013 | David |
| 2014/0351642 A1 | 11/2014 | Bates |
| 2017/0205781 A1* | 7/2017 | Brooks ................. G06Q 50/06 |
| 2020/0010999 A1* | 1/2020 | Lee ........................ G06N 20/00 |

(Continued)

OTHER PUBLICATIONS

Fliss et al., Multiple faults diagnosis using causal graph, In the proceedings of The 6th IEEE International Multi-Conference On Systems, Signals Devices—SSD'09, Djerba, Tunisia, Mar. 23-26, 2009.

(Continued)

*Primary Examiner* — Allen S Lin
(74) *Attorney, Agent, or Firm* — LUMEN PATENT FIRM

(57) ABSTRACT

A method for detecting anomalies in a physical system generates from a set of physics rules and a process graph representing the system a set of candidate physics models that assign physics rules to portions of the process graph representing sensors. Candidate physics models are rejected if an error between the models and sensor data exceed a predetermined error tolerance. Supervised learning is used to train a machine learning model to predict an error between the physics models and the sensor data. The predicted error and predicted sensor measurements from the physics models are then used to detect anomalies using unsupervised learning on a distribution of error between the predicted sensor measurements and the sensor data.

5 Claims, 3 Drawing Sheets

(56) References Cited

U.S. PATENT DOCUMENTS

2020/0258215 A1* 8/2020 Kashyap .............. G06N 3/0454
2021/0016879 A1* 1/2021 Gordon ................. G05D 1/104

OTHER PUBLICATIONS

Fliss et al., Multiple Faults Model-Based Detection and Localisation in Complex Systems, Journal of Decision Systems. vol. 20—No. 1/2011.

Yang et al., Progress in Root Cause and Fault Propagation Analysis of Large-Scale Industrial Processes, Journal of Control Science and Engineering. vol. 2012, Article ID 478373.

Sztyber, Model based diagnosis using causal graph, Pomiary Automatyka Robotyka nr Jan. 2013.

Sole et al., Survey on Models and Techniques for Root-Cause Analysis, arXiv:1701.08546 [cs.AlI], Jul. 3, 2017.

Liu et al., An unsupervised anomaly detection approach using energy-based spatiotemporal graphical modeling, Cyber-Physical Systems, vol. 3, 2017—Issue 1-4, pp. 66-102.

Kira et al., Modeling cross-sensory and sensorimotor correlations to detect and localize faults in mobile robots, IEEE International Workshop on Intelligent Robots and Systems (IROS), Oct. 29- Nov. 2, 2007.

Chung et al., Incipient multiple fault diagnosis in real time with application to large-scale systems, IEEE Transactions on Nuclear Science ( vol. 41 , Issue: 4 , Aug. 1994 ).

Perelman et al., Topological clustering for water distribution systems analysis, Environmental Modelling & Software, vol. 26, Issue 7, Jul. 2011, pp. 969-972.

* cited by examiner

METHOD FOR PHYSICAL SYSTEM ANOMALY DETECTION

FIELD OF THE INVENTION

The present invention relates generally to methods for anomaly detection in physical systems.

BACKGROUND OF THE INVENTION

Existing techniques that monitor and detect anomalies or faults in physical systems suffer from one or more problems. For example, sensors and configuration data may be unreliable in a multitude of ways, e.g., missing data points, sensor stuck sending repeating values, sensor temporarily sticks, sensor drifts. System diagrams may not reflect a current build state, sensors may not be located where reported, or the system diagram may be missing significant information, making traditional simulation infeasible.

Although there have been attempts to address these problems, these approaches have their own difficulties. Simulation approaches are typically extremely expensive to model. Additionally, they are near impossible to keep up to date, as assets may be changing due to wear, replacement, redesign, etc. Approaches that use machine learning often suffer from lack of training examples because systems are unique and do not have enough training examples to cover significant number of situations or faults with accuracy. Expert or rule based approaches are expensive to setup. In addition, they are fragile, as any time the system changes, all the rules need to be reviewed to ensure proper thresholds are set.

BRIEF SUMMARY OF THE INVENTION

In one aspect, the invention provides a method for detecting anomalies in a physical system. The method includes: storing a process graph representing the physical system, wherein nodes of the process graph represent devices of the physical system and edges of the process graph represent causal physical influences between the devices, wherein the devices comprise physical assets and sensors, where the sensors are configured to measure physical quantities; storing physics rules representing relations between measurable physical quantities; generating from the physics rules and the process graph a set of candidate physics models, wherein each of the candidate physics models comprises a physics rule and an assignment of physical quantities of the physics rule to a set of sensor nodes of the process graph; receiving sensor data comprising values of physical quantities measured by the sensors; rejecting a subset of the candidate physics models to produce a subset of valid physics models, where the rejected subset of the candidate physics models is determined by computing for each candidate physics model of the candidate physics models an error between the sensor data and the candidate physics model, and comparing the error with a predetermined error tolerance; for each valid physics model of the valid physics models, using supervised learning to train a machine learning model to predict an error between the valid physics model and the sensor data; for each valid physics model of the valid physics models, calculating predicted sensor measurements from the valid physics model and the error predicted by the machine learning model; for each valid physics model of the valid physics models, using unsupervised learning on a distribution of error between the predicted sensor measurements and the sensor data to detect anomalies of the physical system, wherein an anomaly corresponds to an error between the predicted sensor measurements and the sensor data exceeding a predetermined error threshold. The sensor data may include real time data, and/or historical data. In some implementations, the method includes examining/analyzing the system graph and repairing/modifying it prior to generating the candidate physics models. In some implementations, supervised training is used to train the error model comprises using train/validate/test split methodology.

DETAILED DESCRIPTION OF THE INVENTION

Figure 1:
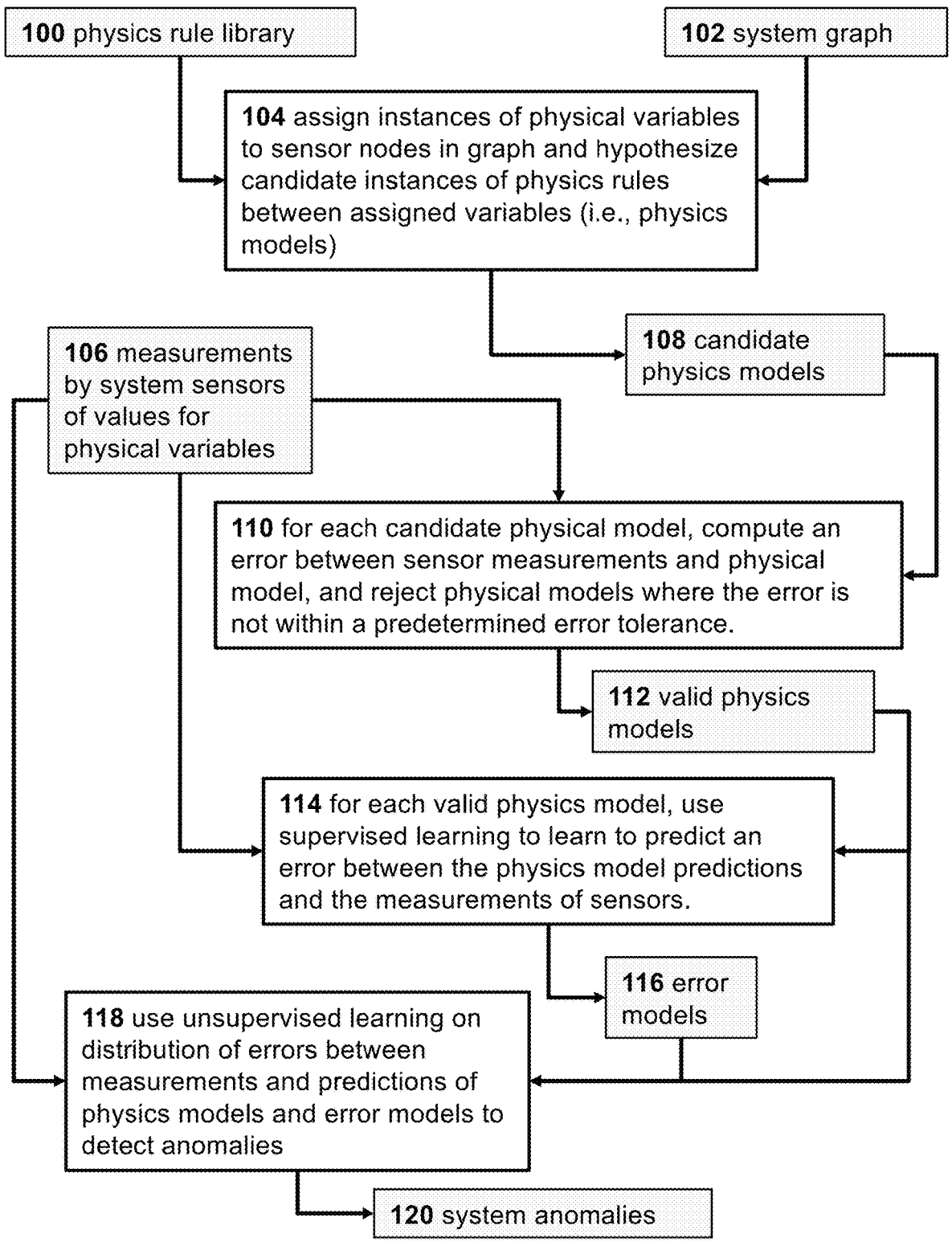
FIG. 1 is a flow chart illustrating the steps of a method for detecting anomalies in a physical system according to an embodiment of the invention.

FIG. 1 is a flow chart illustrating the steps of a method for detecting anomalies in a physical system according to an embodiment of the invention. A system process graph 102 that represents the physical system is stored in a memory. The graph includes a collection of nodes connected by directed edges, where distinct nodes represent distinct devices of the physical system, and where edges represent causal physical influences between the devices. The devices include assets that perform actions in the physical system and sensors that measure physical quantities in the physical system. A system process graph may also include information such as physical dimensions of process variables and other metadata associated with nodes and edges. A complete process graph contains a node for every transforming process of the system, and an edge for every physical connection or causal relation of the system. In addition, it may also include nodes for sensors that are not associated directly with an asset or transforming process.

A process graph is typically derived from a system process diagram which provides a visual schematic representation of the system, such as an engineering schematic. Such a system process graph is typically created by a subject matter expert based on a system process diagram; the process graph is constructed to contain all physical connections or causal relations as edges and all transforming processes as distinct nodes. Alternatively, the process graph may be created by an automatic transformation of a process diagram using image recognition techniques. For example, starting with an image of a system process diagram, standard image recognition techniques may be used to generate a list of all named entities (equipment and sensors) in the image. Then a trained neural network can recognize in the image standardized schematic icons and generate an itemized list of entities and their types, as well as connections between them. Next, the identified entities are matched with the names, for example, based on proximity of bounding boxes entities and names in the image. This matching could take into account standard conventions for positioning names next to their corresponding schematic icons, e.g., placement of names more frequently above and to the left of the icon than below and to the right.

Starting with a structured diagram instead of an image does not require image or character recognition, since visual elements like lines and boxes and text can be automatically extracted. In such a case, the names and entities can be directly extracted. Then heuristics and machine learning may be used to map the visual m elements to semantically meaningful elements (components, sensors, etc.). An example of a heuristic is that we can find a sensor name based on looking for text following the International Organization for Standardization (ISO) standard for piping and instrumentation diagram (P&ID) sensors, then look for lines that begin near to that text, and look to see what visual components those lines point to in order to predict to which component the sensor is attached. The above techniques may also be used to examine/analyze a system graph and repair/modify.

Figure 3A:
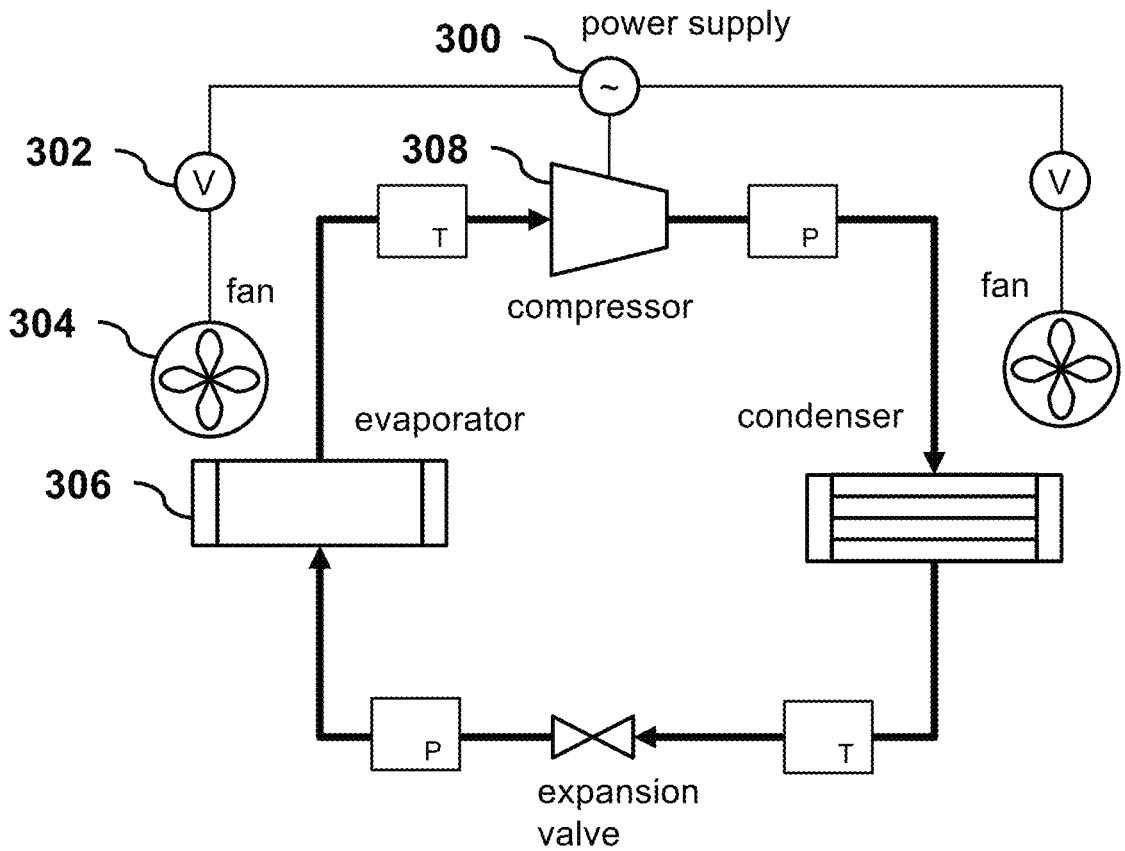
FIG. 3A and FIG. 3B show a schematic process diagram of a physical system and a corresponding process graph, respectively, according to an embodiment of the invention.
Figure 3B:
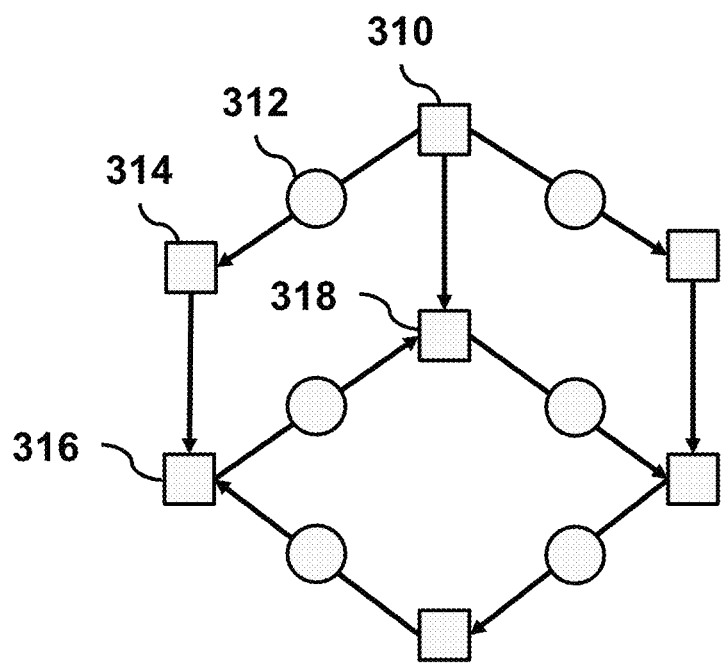

FIG. 3A is an illustrative example of a process diagram of a physical refrigeration system that includes various assets such as power supply 300, fan 304, evaporator 306, and compressor 308. The system also includes various sensors such as voltage meter 302. FIG. 3B is a process graph corresponding to the refrigeration system process diagram of FIG. 3A, where the assets are represented by square nodes and the sensors are represented by round nodes. The directed edges of the graph correspond to electrical or fluidic connections between the assets. For example, nodes 310, 314, 316, 318 represent assets 300, 304, 306, 308, respectively, and node 312 represents sensor 302. The edge from node 310 to node 314 represents the electrical connection from power supply 300 to fan 304, the edge from node 314 to node 316 represents the fluidic connection (i.e., air blowing) from fan 304 to evaporator 306, and the edge from node 316 to node 318 represents the fluidic connection (i.e., flow of refrigerant) from evaporator 306 to compressor 308. The process graph thus provides an abstract representation of the devices in the physical system and their causal physical relationships. The stored process graph also includes physical dimensions (e.g., time, length, mass) and units (e.g., seconds, meters, kilograms) associated with each sensor node.

Returning to FIG. 1, a physics rule library 100 is stored in memory. A physics rule specifies a general mathematical relationship (e.g., function) between physical quantities. They may be defined in a domain-specific language or in code. Each rule specifies a mathematical relationship between multiple variables, where the physical dimensions and units of each variable are specified. For example, the conservation of mass rule (continuity equation) for steady-state flow specifies that the mass flow rate ($kg \cdot s^{-1}$) into and out of any device must be equal, the equation of state of an ideal gas (ideal gas law PV=nRT) specifies a relationship between the pressure ($kg \cdot m^{-1} \cdot s^{-2}$), volume ($m^3$), and temperature (K), where R is the ideal gas constant and n is the number of moles. The physics rule library preferably contains a collection of universal rules that are commonly applicable to portions of industrial systems and plants.

In step 104, the physics rules 100 and system process graph 102 are used to generate a set of candidate physics models associated with portions of the graph 102. More specifically, each of the candidate physics models associates a physics rule with a set of sensor nodes in the graph that are causally related to each other by assigning each physical variable of the physics rule to one sensor node, such that the physical variable and sensor node have the same physical dimension. For example, a physics model could assign the three variables P, V, T of the physics rule PV=nRT to a pressure sensor, volume sensor, and temperature sensor, respectively, of the process graph. Note that if the volume is assumed constant, the physics rule has only two variables P and T, and the model does not include any assignment to a volume sensor. The physics model may be viewed as an specific instantiation of a physics rule, where the variables of the physics rule are instantiated as localized process variables at particular sensors.

Candidate physics models may be identified by traversing the process graph for m local sub-graphs of sensor nodes that are linearly sortable, and for various subsets of the sensor nodes in the sub-graph, searching the physics library for a physics rule whose physical quantities share the same physical dimensions as the process variables for the sensor nodes in the subset. In one embodiment the process graph is first topologically sorted. Then for each node in order in the sorted graph (or sub-graph) the successors and predecessors of the node are determined. A recursive function is called with the node, its successors, and its predecessors as input. This function determines for each node some set of successors sets or predecessor sets. For each node, successors sets or predecessor sets are combined to get a complete set of nodes which it is causal to or completely caused by.

For purposes of illustration, consider a simple sub-graph of a system process graph with nodes A, B, and C connected linearly as follows: A→B→C. This indicates that node A has a causal physical influence on node B, which in turn has a causal physical influence on node C. These nodes A, B, C, might represent, for example, a temperature sensor, a compressor, and a pressure sensor, respectively. So, we can write T(A) and P(C) for the temperature and pressure process variables at sensors A and C, respectively. These process variables have physical dimensions that match physical dimensions of physical quantities in the physics rule PV=nRT. Thus, assuming equal values of n, R, and V at both A and C, we obtain candidate physics model P(C)V=nRT(A).

In step 106, sensor data is received from the physical system. The sensor data includes values of physical quantities measured by the sensors of the physical system. The sensor data may include, for each sensor, a time-indexed sequence of numerical values of the physical quantity measured by the sensor. In other words, the sensor data includes time-indexed values of measured process variables for the system.

Figure 2:
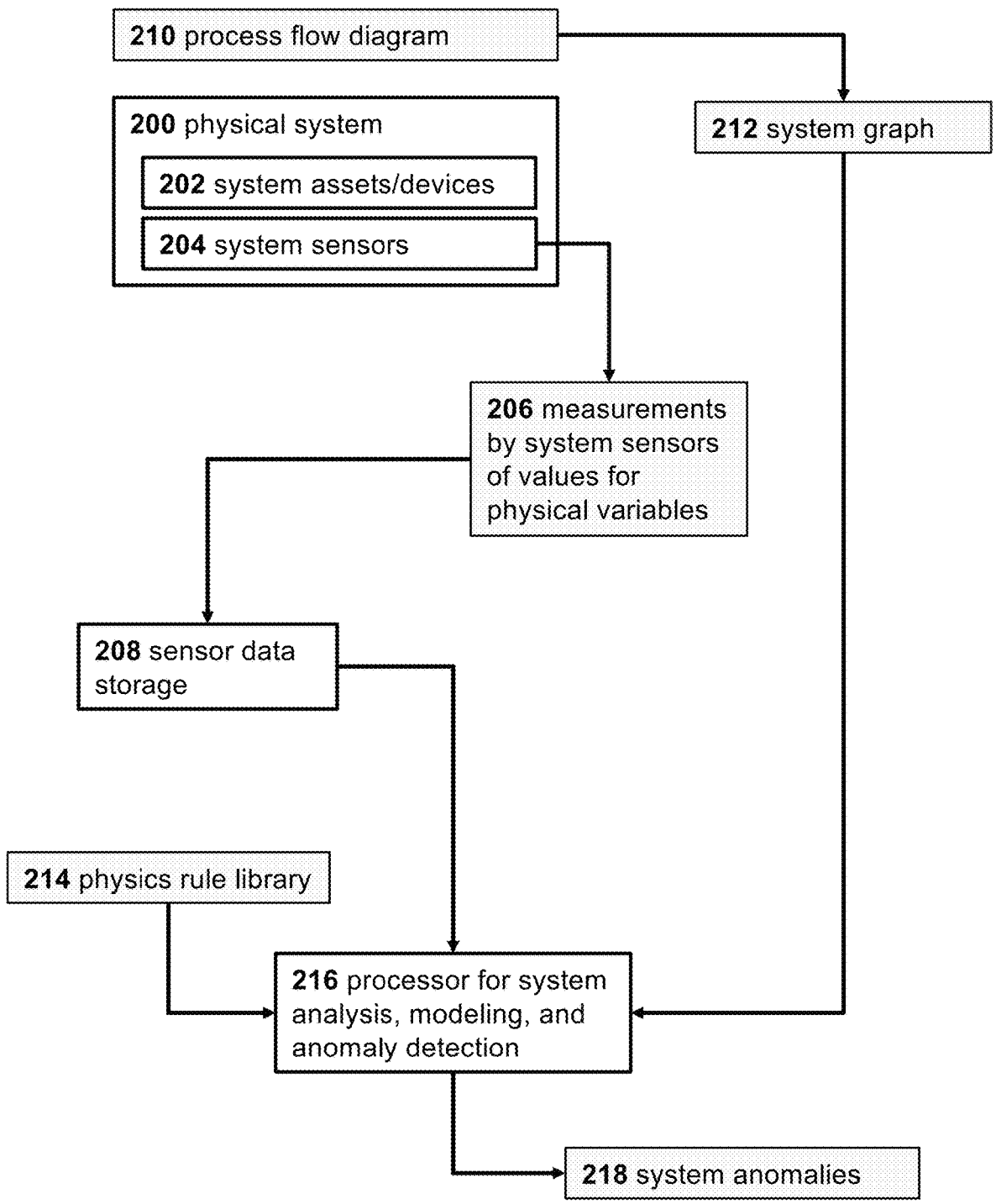
FIG. 2 is schematic diagram illustrating a data processing pipeline for a method for detecting anomalies in a physical system according to an embodiment of the invention.

As illustrated in FIG. 2, the sensor data 206 originates at the physical system 200 which includes assets 202 and sensors 204. The sensor measurement data 206 is then transmitted to sensor data storage 208 (e.g., cloud storage) and then transmitted to a processor 216 that implements the present method of anomaly detection. The processor 216 uses the sensor data 206, physics rule library 214, and system graph 212 derived from system process flow diagram 210 to detect system anomalies 218. Processor 216 may be implemented by a master orchestrator which starts a job for each model for each process graph. Where a job may be local thread or an entire cloud hosted machine; the job fetches its necessary sensor measurement data from a local or cloud time series database.

Returning again to FIG. 1, in physics model validation step no, the candidate physics models 108 are tested for consistency with the sensor data 106. For each of the candidate physics models 108, an error between the sensor data 106 and the candidate physics model 108 is computed. The error is then compared with a predetermined error tolerance. If the error exceeds the predetermined error tolerance, the physics model is rejected. After this validation process, a subset of the candidate physics models 108 are rejected, with a subset of valid physics models 112 remaining. For example, consider a physics model PV=nRT where P and T are process variables associated with two specific pressure and temperature sensors of the physical system, and where V, n, R are constant. The sensor data provides time-indexed sequence of values for the process variables P and T. At each point in time, PV=nRT is used to predict P (or T) based on the measured value of T (or P). The error between the predicted and measured values of P (or T) is statistically analyzed over a time interval. If, for example, the error between the predicted and measured values differ by less than a predetermined m error tolerance (e.g., 3 sigma or 3 standard deviations) over the selected time interval, then the model is validated. The error tolerances for model validation, including the time interval length and other parameters, may be set as part of a system configuration. In the absence of a user-specified predetermined error tolerance, outlier analysis may be performed. This analysis entails gathering statistical properties about the sensors involved during a past period in which it is assumes that the sensors and system are nominal and then observing the error between the predicted and measured values during a validation period.

In some embodiments of the invention, the physics model validation process 110 may also reject a physics model if measured values from one sensor of the model are outside known limits of the sensor, e.g., as determined by sensor manufacturer specifications. In some embodiments, the physics model validation process 110 may also reject a physics model if the measured values from one of the sensors of the physics model exceed limits specified by the physical system operational design, e.g., if the values represent a physically impossible state of the system. These rejections can be reported as anomalies.

It is important to emphasize that the validation of the physics models allows valid models to be identified even in cases where system diagrams do not reflect a current actual state of the physical system, where sensors are not be located where reported, or where the system diagram is missing significant information. Such cases normally would not be tolerated by traditional simulation techniques.

Although the valid physics models 112 reasonably approximate the sensor data within predetermined error tolerances, it is expected that there remains some residual systematic error between the predictions of physics models and the sensor data, e.g., because the actual physical system has complexities that the ideal physics rules do not take into account. In step 114, for each valid physics model 112, a machine learning model is trained using supervised learning to predict the residual error between the predictions of the physics model and the sensor data to produce an error model 116.

For example, in one embodiment the machine learning model is implemented as a neural network. For example, the neural network could be a feedforward or a recurrent neural network, where the initial layer of the network has a number of neurons equal to the number of input features $N_f$ times the temporal look-back samples $N_s$ (i.e., the input is a tensor of shape $N_f \times N_s$). The input to the neural network includes sensor data from sensors of the physics model collected during a time window, e.g., sequences of $N_s$ time samples of measured values from the sensors of the physics model. The look-back period $N_s$ is chosen as a compromise between expectations upon past states affecting current states, noise in the system, the characteristic timescale of the system, and computational limits. In practice a time period of 15 minutes to 1 hour is chosen for compressor models, which correspond to N=3 to 12 for an observation cadence of 5 minutes. The input may also include sensor data from sensors whose nodes are prior to the sensor nodes of the physics model, i.e., they represent process variables that can have causal physical influence on the process variables of the physics model. The input features are chosen using one more combinations of the following: 1) features which are highly correlated, 2) features which a subject matter expert has deemed to be predictive, 3) features which are causal to the sensors on the node being predicted. The input may also include other variables such as time of day, which may have correlation with operation of the system. The output of the neural network is a predicted residual error between the predicted and measured values of one of the process variables of the physics model. For example, in the m case where PV=nRT is used to predict P based on the measured value of T, the network is trained to predict the error between the predicted value of P and the actual measured values of P. Formally, the neural network learns a function Err:$R^{M \times N} \rightarrow R$ that maps an M×N matrix of values from M sensors during N time samples to an estimated residual error between the predicted and measured values of one process variable of the physics model. During training of the neural network, the output of the network is compared with the ground truth residual error calculated using the physics model and the sensor data, and the difference is minimized, e.g., using for a norm function a symmetric mean absolute percent error (SMAPE), Root means square error (RMSE) or Unsealed Mean Bounded Relative Absolute Error (UMBRAE).

In some cases, the ML model can directly predict sensor measurements, such as for portions of the graph when there is no viable physics model. Whenever possible, it is preferable to use a physics model and predict the model and error in order to improve anomaly detection and make diagnosis of anomalies easier for subject matter experts.

Once the machine learning error models 116 for the physics models 112 have been learned, step 118 detects anomalies 120 of the physical system based on sensor data 106. Typically, the sensor data used for detecting anomalies is real-time sensor data, distinct from the sensor data used in the previous steps for physics model validation 110 and learning the residual error learning 114. It is also possible, however, to detect anomalies retrospectively based on historical sensor data. In either case, for each valid physics model, predicted sensor measurements are calculated using the valid physics model and the error estimated by the machine learning residual error model. Specifically, the valid m physics model is used to predict the value of one process variable for the model, and this value is adjusted using the estimated residual error calculated by applying the sensor data as input to the machine learning model. The predicted sensor measurements are designed to represent nominal sensor values that should result from the sensor data, according to the validated physics models and residual error models.

An anomaly in the physical system is detected when an error between the predicted sensor measurements and the sensor data exceeds a predetermined error threshold. This threshold for anomaly detection in unsupervised situations is determined using a user or subject matter expert's desire for sensitivity to faults. It is presumed that during the training period some amount of observations are "anomalous" the user chooses (or in practice we choose) a percent anomalous or choose a number_of_anomalies. Then the unsupervised methods attempt to separate the two groups of data in the training data.

For each valid physics model, unsupervised learning on a distribution of error between the predicted sensor measurements and the sensor data is used to detect anomalies of the physical system. Any of various standard machine learning techniques may be used, such as extreme value analysis or probabilistic and statistical modeling or k-means clustering, isolation forest, or random forest. For example, the value of a sensor may be predicted using the previously mentioned methods and then the residuals (i.e., difference between predicted and true values) are examined. We take as an assumed hyperparameter that 2% of the training observations were anomalous and the we determine what residual corresponding to this fraction of the training data, e.g., we find 2% of the training examples where the residual is more than 7 degrees Fahrenheit. We may then convert all residual values into a score referenced to a "health score" scale of 0 to m 1, where 0 is nominal and 1 is anomalous. One example of a normalization function for this score is $$0.5 \cdot (1 + \tan h[(\text{residual\_value} - \text{mid\_point})/\text{characteristic\_scale}])$$

where mid_point is the residual value that met our hyperparameter config. condition, in this case 7, and characteristic_scale is the sensitivity of scores to increasing residual. In this way all residual_values are scored; all residual values of 0.5 or greater are reported as anomalies.

A powerful feature of this approach is that if during live analysis of a system the number of anomalous observations becomes overwhelming then a user can actively adjust the health score threshold, for example, so that only observations with a health score greater than 0.8 are reported as anomalous.

An anomaly is often the result of a fault, i.e., a singular identifiable problem in the system that causes the anomaly (e.g., a sensor was unplugged, a sprocket was broken, a fuse was blown, a motor failed).

Faults may be identified by examining the graph and, in situations where we have multiple sensors that read the same or equivalent values, cross-comparing the sensor predictions. For example, if there are two or more sensors that measure the same temperature then the anomalies predicted by the models that contained those two sensors are examined. If one of those sensors produces anomalies (or high health scores) when models not containing that sensor do not produce anomalies, then we identify that sensor as being faulty.

The anomaly detection step 118 can be repeated indefinitely with new batches of sensor data 106. In addition, if the system process graph 102 changes, new physics models and corresponding residual error models can be learned, and anomalies detected based on the new models.

Embodiments of the invention may combine the physics-rule based models with other types of machine learning models. For example, a neural network model can be trained on training sensor data to predict sensor data without any constraints or guidance from physics-rule based models. Such models may be useful in parts of the process graph where no valid physics model exists.

The invention claimed is:

1. A method for detecting anomalies in a physical system comprising devices, the method comprising:
   storing in a memory storage device a process graph representing the physical system, wherein the process graph comprises nodes and edges connecting the nodes;
   wherein each of the nodes of the process graph represents a corresponding device of the devices of the physical system and each of the edges of the process graph represents a causal physical influence between a pair of the devices, wherein the devices comprise physical assets and sensors, where the sensors are configured to measure physical quantities of the physical system;
   storing in the memory storage device physics rules comprising definitions of physical variables, functional relationships between the physical variables, and specifications of physical dimensions for the physical variables;
   generating by a processor from the physics rules and the process graph a set of multiple candidate physics models, wherein each of the multiple candidate physics models comprises a physics rule selected from the physics rules and an assignment of each variable of the physical variables of the physics rule to a sensor node of a set of sensor nodes of the process graph, wherein each variable and the assigned sensor node have the same physical dimension;
   measuring by the sensors of the physical system values of the physical variables;
   receiving by the processor sensor data comprising the values of the physical variables measured by the sensors;
   rejecting by the processor a subset of the multiple candidate physics models to produce a subset of valid physics models, where the rejected subset of the multiple candidate physics models is determined by
      (i) computing for each candidate physics model of the multiple candidate physics models
         (a) predicted values of the candidate physics model by applying the candidate physics model to sensor data of a first subset of sensors associated with the candidate physics model and
         (b) an error between the sensor data of a second subset of sensors of the candidate physics model and the predicted values of the candidate physics model, and
      (ii) comparing the error with a predetermined error tolerance;
   for each valid physics model of the valid physics models, using supervised learning by the processor to train a machine learning model to predict an error between predicted values of the valid physics model and the sensor data;
   for each valid physics model of the valid physics models, calculating by the processor
      (i) predicted sensor measurements from the valid physics model and
      (ii) the error predicted by the machine learning model;
   for each valid physics model of the valid physics models, using unsupervised learning on a distribution of error between the predicted sensor measurements and the sensor data to detect anomalies of the physical system, wherein an anomaly corresponds to an error between the predicted sensor measurements and the sensor data exceeding a predetermined error threshold;
   reporting to a user the detected anomalies of the physical system.

2. The method of claim 1 wherein generating the set of multiple candidate physics models comprises traversing the process graph for local sub-graphs of linearly sortable sensor nodes, and searching the physics rules for a physics rule whose physical dimensions are the same physical dimensions as process variables for the sensor nodes in the subgraph.

3. The method of claim 1 wherein generating the set of multiple candidate physics models comprises applying a graph-traversing recursive function to nodes of the process graph to create a subgraph of the process graph.

4. The method of claim 1 wherein the system graph is examined and repaired prior to generating the multiple candidate physics models.

5. The method of claim 1 further comprising reporting to the user the rejected subset of the multiple candidate physics models.

* * * * *